Feb. 7, 1956 H. F. MALONE 2,734,159
ELECTRIC CONTROL SYSTEM AND OPERATING
SWITCH FOR WINDSHIELD WIPER MOTORS
Filed May 25, 1953 2 Sheets-Sheet 1
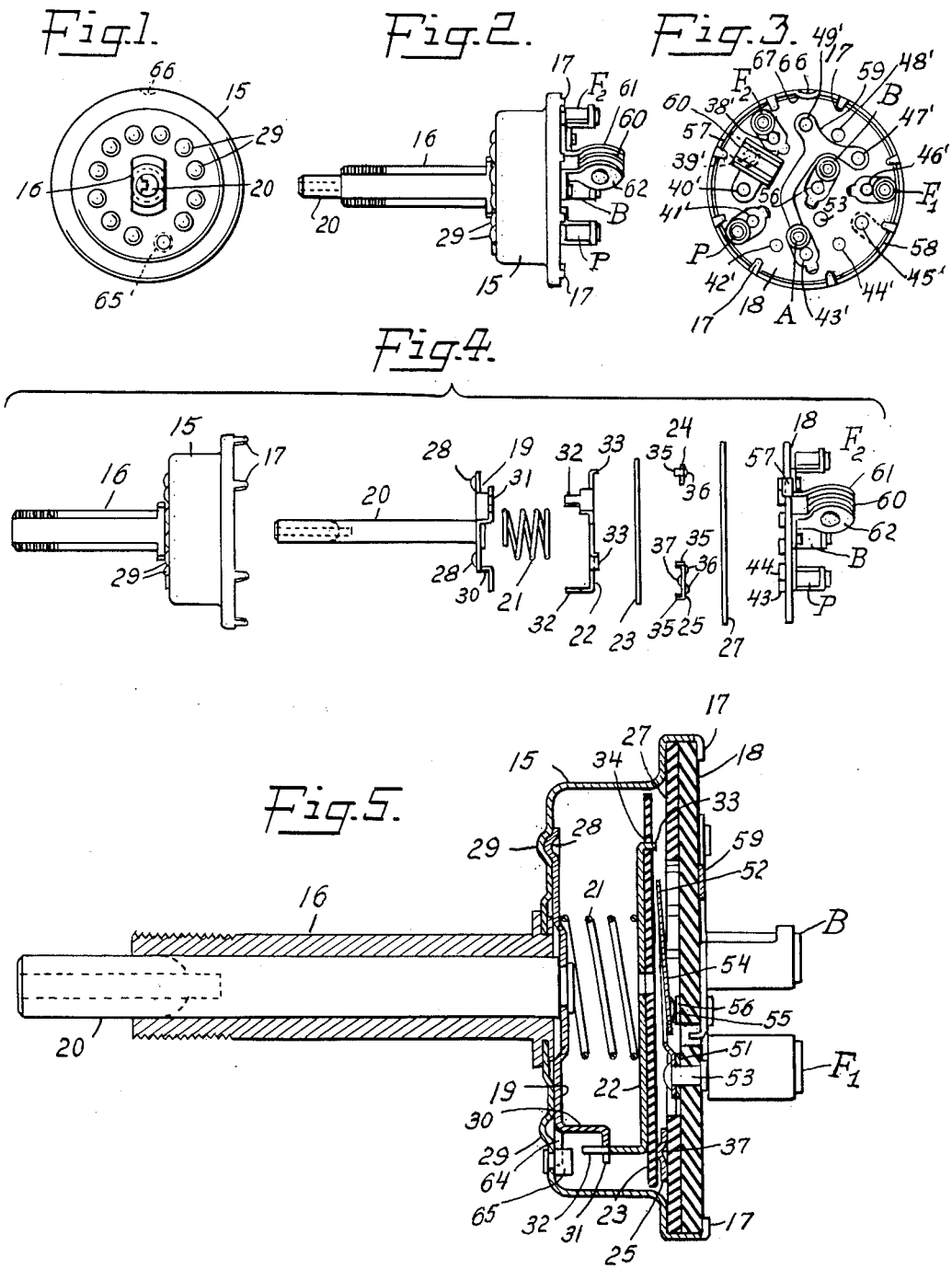
INVENTOR
HOMER F. MALONE
BY
ATTORNEYS Feb. 7, 1956    H. F. MALONE    2,734,159
ELECTRIC CONTROL SYSTEM AND OPERATING
SWITCH FOR WINDSHIELD WIPER MOTORS
Filed May 25, 1953    2 Sheets-Sheet 2
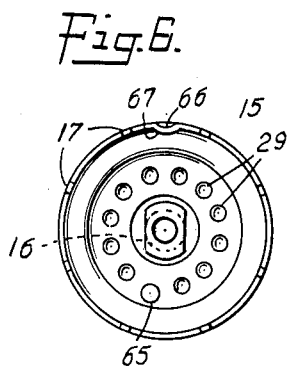
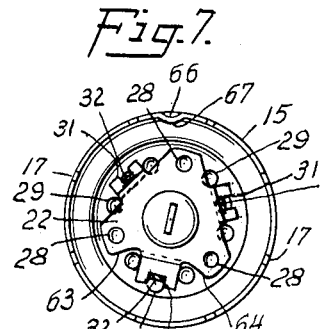
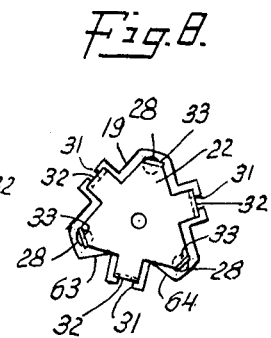
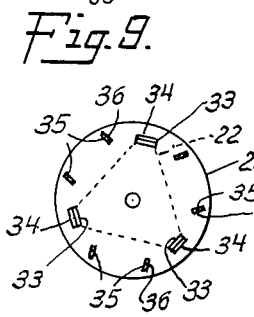
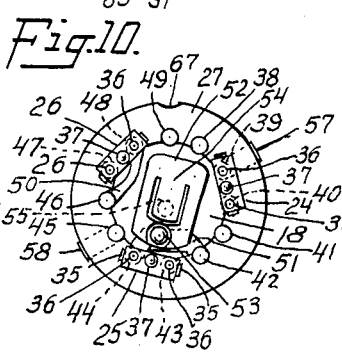
INVENTOR
HOMER F. MALONE
BY
Pennie, Edmonds, Morton, Barrows & Taylor
ATTORNEYS United States Patent Office 2,734,159
Patented Feb. 7, 1956

2,734,159

ELECTRIC CONTROL SYSTEM AND OPERATING SWITCH FOR WINDSHIELD WIPER MOTORS

Homer F. Malone, Millburn, N. J., assignor to The Wilcolator Company, Elizabeth, N. J., a corporation of Delaware Application May 25, 1953, Serial No. 357,195

9 Claims. (Cl. 318—257)

This invention relates to improvements in electrical systems for operating windshield wipers and to an improved electric switch therefor. More particularly, the switch includes a circuit breaker means adapted to protect the electrical windshield wiper system including a windshield wiper motor from current overloads.

In general, the electric system of the present invention is an improvement on known systems of the type adapted to operate a windshield wiper at two speeds when an electric circuit is selectively closed for operation of a windshield wiper motor, and to operate the windshield wiper blades to a predetermined parked position when the circuit of the system is opened.

The primary object of the present invention is to provide an electric windshield wiper system which is considerably simplified with respect to prior systems and which includes means for protecting the system including the windshield wiper motor from current overloads.

A further object of the invention is to provide an improved operating switch in the system which integrally includes a thermostatic circuit breaker and other important elements of the system, such switch being simple to install and easily operable by the operator of a vehicle.

In accordance with the invention, the improved system includes a motor for operating a windshield wiper, an electric circuit arrangement connected into the motor and including a rotary electric switch provided with a number of regularly-spaced contacts suitably arranged so that operation of the rotor of the switch in one direction energizes the windshield wiper motor to operate it at a slow speed in one direction, whereas movement of the switch to a second operating position causes operation of the windshield wiper motor at a higher speed. Furthermore, the switch and system are so arranged that rotation of the switch rotor in the reverse direction causes operation of the windshield wiper motor at a slow speed until the blades of the windshield wiper reach a predetermined parking position, whereupon the electric circuit through the motor is automatically opened.

In a preferred construction, the improved switch includes a thermostatic circuit breaker means so arranged that it is in circuit with the windshield wiper motor whenever the motor is energized. Furthermore, the improved switch preferably includes an integrally mounted resistance connected into particular contacts of the switch for use in influencing the operation of the motor in one of its operations.

The invention includes other features, objects, and advantages which are described hereinafter along with a detailed description of the invention in connection with one embodiment thereof illustrated in the accompanying drawings forming a part of this application.

In the drawings:

Fig. 1 is a front elevational view of an improved windshield wiper switch constructed in accordance with the invention;

Fig. 2 is a side elevational view of the switch shown in Fig. 1;

Fig. 3 is a rear elevational view of the switch shown in Figs. 1 and 2;

Fig. 4 is an exploded view showing the various elements or components of the switch illustrated in Figs. 1 to 3;

Fig. 5 is a transverse sectional view through the switch shown in Figs. 1 to 4 with the various parts of the switch assembled in their operative positions;

Fig. 6 is an inside view of the cover of the switch with the contents removed;

Fig. 7 is an inside view of the cover of the switch with the detent plate and operating shaft in position, with the pins of the driving plate shown in section engaged in the detent plate;

Fig. 8 is a back view of the driving plate;

Fig. 9 is a back view of the driving disc shown in engagement with the driving plate, and showing the lugs of the contact bridges in section;

Fig. 10 is a front view of the base or back plate assembly of the switch showing three contact bridges in one operative position of the switch rotor;

Fig. 11 is an enlarged perspective view of one of the three similar contact bridges used in the switch; and Fig. 12 is a diagrammatic view of a windshield wiper system according to the invention showing the switch contacts connected in the three possible operative positions of the switch.

Referring to Figs. 1 to 5 of the drawings, the improved switch of the present invention, as used in the system and circuit shown in Fig. 12, and which integrally includes substantially all of that circuit, comprises a metal cover 15 carrying at its front an axially mounted and threaded bushing 16 by which the switch may be mounted on the dashboard of a motor vehicle in a known manner. The cover 15 is made in cup-shaped form, as shown in Figs. 4 and 5 and carries tabs 17 adapted to extend around the peripheral portion of a base plate assembly 18, the tabs being bent over on the base plate for retaining it in position in the back enlarged portion of the cover 15.

The other elements of the switch, as shown in Fig. 4 include a rotatable detent plate 19, staked to an operating shaft 20, which extends through the bore of the bushing 16 and is adapted to receive a switch operating knob, not shown. The other elements in order include a spring 21, a metal driving plate 22, a driving disc 23 of hard insulating material, three similar contact bridges 24, 25 and 26, a spacer plate or ring 27 of insulating material, and the base plate 18 of hard insulating material.

The detent plate 19 staked to the shaft 20 is shown more in detail in Figs. 5 and 7 and includes a generally triangular-shaped flat section, each corner of which includes an impressed detent 28 extending toward the inside of the switch cover and adapted to seat in detent recesses 29, Figs. 1 and 5, and to position the switch rotor correctly. The plate 19 also includes three regularly-spaced backwardly extending portions 30, which are bent outwardly and notched at 31 to receive three regularly-spaced forwardly bent pins 32 of the driving plate 22. The notches 31 are regularly spaced angularly about the plate 19 and alternate regularly with the detent projections 28. The plate 22 also includes three regularly spaced backwardly-extending projections or lugs 33 alternating angularly with the pins 32 and adapted to engage in slots 34 in the driving disc 23 in the manner shown in Fig. 9. The contact bridges 24, 25 and 26 are mounted at regularly-spaced angular positions on the back of the disc 23 and each includes a pair of projections 35 which extend forwardly through corresponding pairs of openings 36 in the plate 23. In Fig. 9, the projections 35 are shown in section in these slots and the outline of the driving plate 22 is shown in dotted lines.

Each of the three contact bridges 24, 25 and 26, as shown in Fig. 11, includes two backwardly projecting contacts 36 spaced so as to engage two adjacent contacts mounted on the front of the back plate 18. The contact bridges also include a pressed out forward rocker projection 37 at its center, which bears against the hard plane surface of the driving plate 23 and serves as a rocker for the contact bridge so as to insure effective contact pressure on both contacts engaged by the spaced bridge contacts 36.

The back plate 18 of insulating material carries a circular series of twleve contacts 38 to 49, regularly spaced angularly with respect to each other. These contacts are carried on rivets extending through the back plate 18 and project forwardly of the plate 18, as shown in Figs. 4 and 10. The rivets securing the twelve contacts to the back plate 18 are given the corresponding numbers plus a prime, as shown in Fig. 3. The row of contacts is surrounded by the ring of insulating material 27 having a scalloped inner periphery, as shown in Fig. 10, fitting around the contacts. The ring 27 has a thickness equal to that of the projecting twelve contacts and provides a surface on which the contacts of the bridges 24, 25 and 26 slide from one position to the other, as indicated in Fig. 5.

Referring to Fig. 10 of the drawings, contacts 46 and 48 are connected by a metal jumper plate 50 resting against the front face of the plate 18. Contacts 42 and 44 are also connected by a metal jumper plate 51 resting against the front surface of the plate 18, and on this jumper plate a bimetal snapper blade 52 is fixed and connected by a rivet 53. The bimetal blade 52 is recessed at the position of the rivet 53, as shown in Fig. 5, so that the main body of the blade is held slightly above the body of the base plate 18, the blade as a whole being surrounded by the spacer ring 27 and a circular row of twelve contacts.

The bimetal blade 52 has a U-shaped slot, as shown in Fig. 10 forming a tongue 54, which on its underside at its end, carries a contact 55 biased against a contact rivet 56 extending through the back plate 18 and riveted to a battery terminal connector B. The recess pressed into the bimetal blade at the position of the rivet 53 is formed in such a manner as to stress the sides of the blade opposite the free end of the tongue toward each other, thereby curving the blade and biasing the free end of the tongue carrying the contact 55 toward the contact rivet 56. Ground connections in the form of jumper plates 57 and 58 are respectively carried on the rivets of contacts 39 and 45 between the plate 18 and ring 27. These jumper plates are of spring metal and are bent over the edge surface of the plate 18 so that they engage the metal surface of the switch casing 15 in the manner shown in Fig. 3, when the elements of the switch are assembled, it being understood that the casing 15 is grounded to the body of the vehicle.

The rear of the back plate 18, as shown in Fig. 3 carries a metal jumper plate 59 secured by rivets 43', 47' and 49', thereby electrically connecting the corresponding contacts. The rivet 43' also secures and connects a terminal connector A to the jumper plate 59, and thereby to the three contacts referred to. The back of the plate 18 also carries an electrical resistor 60 fixed between metal brackets 61 and 62 secured by rivets 38' and 40', thereby connecting the resistor between the corresponding contacts. The rivet 38' also secures a terminal connector $F_2$ which includes a portion resting on the bracket 61 so that this terminal connector is connected into the contact 38 and through the resistor 60 to the contact 40. The back plate 18 also carries a further terminal connector $F_1$ mounted on the rivet 46' and electrically connected to the contact 46. For the usual wiper motor the resistor 60 has a value of about 4.6 ohms.

The rotor of the switch of the present invention is arranged to have three positions so that the contact bridges 24, 25 and 26 may be rotated from an initial position to two succeeding positions and back to the initial position. Accordingly, the member 19, as shown in Figs. 7 and 8, is provided with two spaced inwardly-extending edges 63 and 64 adapted to respectively engage the opposite sides of a stud 65 riveted inside the casing 15. When the edge 64 is in contact with the stud 65, the switch is in its initial or off position, whereas when the edge 63 is in contact with the stud 65 the switch is in its third position. At half way between the switch is in its first "on" position. In Fig. 8, the elements 19 and 22 are shown in assembled relationship looking toward the front. In order to properly orient the driving plate 22 with the member 19, one of the pins 32 is made slightly larger than the others and the same is true of the corresponding notch 31 in the member 19. The driving disc 23 and the contact bridges carried thereby are symmetrical and are properly oriented by the rearwardly projecting lugs 33.

In assembling the elements of the switch shown in Fig. 4, the spring 21 is assembled between the elements 19 and 22, the driving disc 23 is set onto driving plate 22 and the contact bridges are located in position thereon and this entire assembly set in the cover 15. Now with the ring 27 in place on the back plate 18, the latter is inserted in the enlarged back opening of the cover 15 so that the indent 66 in the periphery of the cover fits in the notch 67 in the edges of the ring 27 and back plate 18. The circular row of contacts is then properly oriented with respect to the contact bridges 24, 25 and 26. Finally the tabs 17 are pressed in over the back plate 18, as shown in Figs. 2, 3 and 5.

Fig. 12 shows, diagrammatically the circular series of twelve contacts and the circuit arrangement integrally included in the switch described above, in connection with its association with a windshield wiper motor, a parking switch and a battery. In Fig. 12, the jumper plates 50, 51 and 59 are shown by lines and the various terminal connectors A, B, P, $F_1$ and $F_2$ are all indicated, as is also the thermostatic circuit breaker switch. The windshield wiper blades and associated lever means for operating them is not shown in Fig. 12, but merely a windshield wiper motor comprising an armature 68 and a field winding 69, and a blade parking switch. The means for supplying current to the windshield wiper motor comprises the usual automobile battery 70 having a ground connection 71 and a connection 72 plugged into the terminal connector of the switch. The terminal connector A is connected by lines 73 and 74 to the armature of the motor which is also connected to the ground by a line 75. The terminals of the field winding 69 are respectively connected by lines 76 and 77 into the terminal connectors $F_1$ and $F_2$ of the switch.

In Fig. 12 the terminal connector P for the parking connection is connected by a wire 78 with one side of a parking switch 79, having a fixed contact 80 connected to the armature by the wire 74, and a spring arm 81 having a contact biased by the spring arm into engagement with the contact 80 under normal conditions. Under certain conditions the spring arm 81, carrying an operating pin 82 is moved out of engagement with the contact 80, as when the blades of the windshield wiper come into the desired parking position. The pin 82 is actuated by a cam 83 carried on an arm pivoted at 84, the cam being actuated by a link 85 associated with the windshield wiper linkage mechanism in a conventionally known manner.

The operation of the improved switch mechanism of the present invention in connection with the operation of an electric windshield wiper motor and parking switch, is indicated in Fig. 12, in which the positions of the contact bridges 24, 25 and 26, shown by dotted double lines, are in the "off" or parking position, corresponding to the position of the shaft 20 when it is rotated to its extreme counterclockwise position. The switch 79 is open or opened in the "off" position of the switch rotor. When the shaft 20 is rotated from the "off" position one step in a clockwise direction, the contact bridges 24, 25 and 26 are shifted to the double full line positions shown in Fig. 12 so that contacts 38 and 39 are interconnected.

contacts 42 and 43 are interconnected and contacts 46 and 47 are interconnected. In this position of the switch, the motor runs forward at a slow speed, it being noted that both the armature 68 and field winding 69 are connected to the battery and to ground, the field being grounded through contact 38, bridge 24, contact 39 and ground 57.

When the shaft 20 is turned clockwise to the second position away from the stop, the position of the contact bridges will be those shown by the double dot and dash lines in Fig. 12. The windshield wiper motor now runs forward but at a fast speed, since the resistance 60 is inserted in the field circuit, current from the battery flowing through the field winding 69, wire 77 to contact 38 then through the resistance 60, contact 40, contact bridge 24, contact 39 and to the ground connection 57. The circuits from the battery 70 are readily traceable.

When it is desired to turn off the windshield wiper motor from the second or fast speed position, the switch shaft 20 is rotated counterclockwise to the stop so that the contact bridges are in the positions represented by double dotted lines shown in Fig. 12. As a result of this operation, current from the battery flows through contact 42, contact bridge 25, contact 41, terminal connector P, line 78, switch 79 and line 74 to the armature 68. Current also flows from the line 74 through lines 73, 59, contact 49, contact bridge 24, contact 38, terminal connector F₂, line 77 and the field winding 69, the field winding now being grounded through line 76, terminal connector F₁, contact 46, contact bridge 26, contact 45 and ground connection 58. In this way the current is reversed through the field winding 69 and the motor reverses and runs backwards at a slow speed until the cam 83 opens the parking switch 79. The cam-operated parking switch 79 is opened each revolution of the slow speed crank of the windshield wiper mechanism, at the proper place to stop the windshield wiper blades at the windshield molding. After the windshield wiper blades have been parked, the switch 79 remains open, corresponding to the normal "off" position of the rotary switch.

An important feature about the rotary switch mechanism of the present invention is that it integrally includes all of the circuits for the windshield wiper operating mechanism ready for use when the proper leads are plugged into the terminal connectors. This is clearly shown by comparing Figs. 3, 10 and 12. Furthermore, the switch includes a thermostatic safety circuit breaker, in the form of a bimetal blade, which is adapted to prevent damage to any of the circuits or the motor, since it is designed to snap the contact 55 away from the contact 56 in case of any overheating. For the usual automobile installation the bimetal blade 52 is designed to hold its closed position continuously at an ambient temperature of 77° F. with a current of 8 to 10 amperes and interrupt with a current above 10 amperes. The circuit breaker is arranged directly in battery connection so that the entire switch operating mechanism and lines leading therefrom to the windshield wiper motor and parking switch are all protected against overheating or current overloads regardless of the rotated position of the rotary switch.

What I claim is:

1. In a rotary electric switch including a plurality of operative circuits including a base plate of insulating material, a plurality of terminal connectors mounted on the back of said base plate, a contact mounted at the front of said base plate for each of said terminal connectors and connected thereto, a terminal connector mounted on the back of said base plate for connection to a source of electric energy, a bimetal blade having a movable contact mounted on the front of said base plate in fixed position and electrically connected to said last-mentioned terminal connector, a circular series of contacts mounted at the front of the base plate including the contacts connected to said terminal connectors, a rotor adapted to be rotated to a plurality of positions including a driving member of insulating material axially arranged with respect to and facing said series of contacts, a plurality of metal contact bridges carried by said driving member regularly spaced angularly with respect to each other and each engaging and connecting two adjacent contacts of said series in each position of the rotor, means electrically connecting said bimetal blade with at least one of said series of contacts not connected to said terminal connectors, said bimetal blade being deflectable to disengage its movable contact when the current load supplied by the source of electric energy exceeds a predetermined value, and means for rotating said driving member on its axis for in turn moving said contact bridges to the different switch positions.

2. In a rotary electric switch including a plurality of operative circuits including a base plate of insulating material, a plurality of terminal connectors mounted on the back of said base plate, a contact mounted at the front of said base plate for each of said terminal connectors and connected thereto, a resistor mounted on the back of the base plate with one of its terminals connected into one of the contacts, a circular series of contacts mounted at the front of the base plate including the contacts connected to said terminal connectors, a rotor adapted to be rotated to a plurality of positions including a driving member of insulating material axially arranged with respect to and facing said series of contacts, a plurality of contact bridges carried by said member equally spaced angularly with respect to each other and each engaging and connecting two adjacent contacts of said series in each position of the rotor, means electrically connecting the other terminal of said resistor with one of said series of contacts not connected to said terminal connectors, a terminal connector mounted on the back of said base plate for connection to a source of electric energy and electrically connected to at least one of said series of contacts not connected to said terminal connectors or to said resistor, means for rotating said driving member on its axis for in turn moving said contact bridges to the different switch positions.

3. In a rotary electric switch including a plurality of operative circuits including a base plate of insulating material, a plurality of terminal connectors mounted on the back of said base plate, a contact mounted at the front of said base plate for each of said terminal connectors and connected thereto, a terminal connector mounted on the back of said base plate for connection to a source of electric energy, a bimetal blade having a movable contact mounted on the front of said base plate in fixed position and electrically connected to said last-mentioned terminal connector, a circular series of contacts mounted at the front of the base plate including the contacts connected to said terminal connectors, a resistor mounted on said base plate having terminals respectively connected into two contacts of said series, a rotor adapted to be rotated to a plurality of positions including a driving disc of insulating material axially arranged with respect to and facing said series of contacts, a plurality of metal contact bridges carried by said disc regularly spaced angularly with respect to each other and each engaging and connecting two adjacent contacts of said series in each position of the rotor, means electrically connecting said bimetal blade with at least one of said series of contacts not connected to said terminal connectors, said bimetal blade being deflectable to disengage its movable contact when the current load supplied by the source of electric energy exceeds a predetermined value, and means for rotating said driving disc on its axis for in turn moving said contact bridges to the different switch operating positions.

4. In a rotary electric switch including a plurality of operative circuits for controlling the operation of a reversible electric windshield wiper motor having an armature and a field winding and a wiper blade parking switch one side of which is connected into the armature of the motor, the rotary switch having an "off" position and first and second "on" positions in series and comprising a base plate of insulating material, a plurality of terminal connectors mounted on the back of the base plate for connection respectively to the armature of the motor, the two terminals of the field winding of the motor and to the other side of the parking switch, a terminal connector mounted on the back of said base plate for connection to a source of electric energy, a bimetal snap acting blade circuit breaker mounted on the front of said base plate in fixed position having a movable contact and electrically connected to said last-mentioned terminal connector, a circular series of twelve electric contacts regularly spaced angularly with respect to each other and mounted at the front of the base plate around said bimetal blade, a rotor including a driving disc of insulating material axially arranged with respect to and facing said circular series of contacts, three metal contact bridges carried by said driving disc regularly spaced angularly with respect to each other and each engaging and connecting two adjacent contacts of said series in each position of the rotor, said three contact bridges being respectively operable over three separate groups of four contacts in series of said series of twelve contacts, each contact bridge respectively interconnecting the first and second, the second and third and the third and fourth contacts of its group of four contacts when the rotor is respectively in its "off" position, its first "on" position and its second "on" position, a resistor mounted on said base plate and having terminals respectively connected into the first and third contacts of one group of four contacts, a ground connection from the second of said one group of four contacts, a connection from the first contact of said one group of four contacts to one terminal connector for the field winding, the fourth contact of said one group of four contacts being connected to the terminal connector for the parking switch, a ground connection from the fourth contact of the second group of four contacts, the first and third contacts of the second group of four contacts being interconnected and connected to the bimetal blade, the second contact of the second group of four contacts being interconnected with the second and fourth contacts of the third group of four contacts and all three connected to the terminal connector for the armature of the motor, and the first and third contacts of the third group of four contacts being interconnected with each other and connected to the other terminal connector for the field winding of the motor.

5. A rotary electric switch as claimed in claim 4, in which the movable contact of the bimetal blade is normally in engagement with a fixed contact electrically connected to the terminal connector for the source of electric energy, and means connecting the body of the bimetal blade to the first and third contacts of the second group of four contacts.

6. In a rotary electric switch including a plurality of operative circuits for controlling the operation of a reversible electric windshield wiper motor having an armature and a field winding and a wiper blade parking switch one side of which is connected into the armature of the motor, the rotary switch having an "off" position and first and second "on" positions in series and comprising a base plate of insulating material, a plurality of terminal connectors mounted on the back of the base plate for connection respectively to the armature of the motor, the inlet and outlet terminals of the field winding of the motor and to the other side of the parking switch, a terminal connector mounted on the back of said base plate for connection to a source of electric energy, a circular series of twelve electric contacts equally spaced with respect to each other and mounted at the front of the base plate, a rotor including a driving disc of insulating material axially arranged with respect to and facing said circular series of contacts, three contact bridges carried by said disc regularly spaced angularly with respect to each other and each engaging and connecting two adjacent contacts of said series in each position of the rotor, said three contact bridges being respectively operable over three separate groups of four contacts in series of said series of twelve contacts, each contact bridge respectively interconnecting the first and second, the second and third and the third and fourth contacts of its group of four contacts when the rotor is respectively in its "off" position, its first "on" position and its second "on" position, a resistor mounted on said base plate and having terminals respectively connected into the first and third contacts of one group of four contacts, means providing a ground connection from the second of said one group of four contacts, a connection from the first contact of said one group of four contacts to the terminal connector for the outlet terminal of the field winding, the fourth contact of said one group of four contacts being connected to the terminal connector for the parking switch, means providing a ground connection from the fourth contact of the second group of four contacts, the first and third contacts of the second group of four contacts being interconnected and connected to the terminal connector for the source of electric energy, means interconnecting the second contact of the second group of four contacts with the second and fourth contacts of the third group of four contacts and all three contacts to the terminal connector for the armature of the motor, and means interconnecting the first and third contacts of the third group of four contacts with each other and with the terminal connector for the inlet terminal of the field winding of the motor.

7. A rotary electric switch as claimed in claim 6, including a metal casing enclosing the rotor and holding the base plate, said means providing a ground connection comprising a metal member secured to a contact and engaging said metal casing.

8. A rotary switch as claimed in claim 6, in which the means interconnecting contacts of said series of twelve contacts comprises a metal jumper plate mounted on the base plate.

9. A rotary electric switch as claimed in claim 1, in which the circular series of contacts consists of twelve contacts equally spaced angularly with respect to each other around the bimetal blade, and three metal contact bridges carried by said driving member.

References Cited in the file of this patent

UNITED STATES PATENTS

| | | |
|---|---|---|
| 2,513,247 | Morton | June 27, 1950 |
| 2,624,030 | Swan | Dec. 30, 1952 |